(12) United States Patent
Elsner et al.

(10) Patent No.: US 7,885,200 B2
(45) Date of Patent: Feb. 8, 2011

(54) APPLICATION DELAY ANALYSIS (75) Inventors: Russell Mark Elsner, Bethesda, MD (US); John Wilson Strohm, Rockville, MD (US); Michael S. Canney, Cedar Rapids, IA (US)

(73) Assignee: OPNET Technologies, Inc., Bethesda, MD (US)

( * ) Notice: Subject to any disclaimer, the term of this patent is extended or adjusted under 35 U.S.C. 154(b) by 683 days.

(21) Appl. No.: 11/397,359

(22) Filed: Apr. 4, 2006

(65) Prior Publication Data
US 2007/0028142 A1 Feb. 1, 2007

Related U.S. Application Data (60) Provisional application No. 60/703,584, filed on Jul. 29, 2005.

(51) Int. Cl.
*H04L 12/26* (2006.01)
(52) U.S. Cl. ............... 370/252; 370/241; 703/2; 703/13; 703/21; 703/22; 709/223; 709/224; 709/225; 709/226; 714/100; 714/1; 714/25
(58) Field of Classification Search .......... 370/241, 370/252; 703/2, 13, 21, 22; 714/100, 1, 714/25; 709/223–226
See application file for complete search history.

(56) References Cited

U.S. PATENT DOCUMENTS

| 5,768,552 | A | | 6/1998 | Jacoby | |
|---|---|---|---|---|---|
| 5,867,483 | A | * | 2/1999 | Ennis et al. | 370/252 |
| 6,272,539 | B1 | * | 8/2001 | Cuomo et al. | 709/223 |
| 6,735,553 | B1 | * | 5/2004 | Frogner et al. | 702/186 |
| 6,801,940 | B1 | | 10/2004 | Moran et al. | |
| 6,820,042 | B1 | | 11/2004 | Cohen et al. | |
| 2004/0143663 | A1 | * | 7/2004 | Leedom et al. | 709/226 |
| 2005/0228880 | A1 | * | 10/2005 | Champlin | 709/224 |
| 2006/0059205 | A1 | * | 3/2006 | Shah et al. | 707/200 |
| 2006/0104308 | A1 | * | 5/2006 | Pinkerton et al. | 370/469 |
| 2006/0189330 | A1 | * | 8/2006 | Nelson et al. | 455/457 |
| 2006/0251232 | A1 | * | 11/2006 | Wuthnow et al. | 379/201.01 |

OTHER PUBLICATIONS

U.S. Appl. No. 11/358,538, filed Feb. 21, 2006, Malloy et al.

* cited by examiner

*Primary Examiner*—William Trost, IV
*Assistant Examiner*—Charles C Jiang
(74) *Attorney, Agent, or Firm*—Robert M. McDermott, Esq.

(57) ABSTRACT

A graphic user interface facilitates the hierarchical analysis of timing parameters related to network-based applications. At the top level of the hierarchy, the user is presented a summary of the delays incurred while running an application, or while simulating the running of an application, organized by delay categories, including processing delays at each node, as well as propagation delays at each link between nodes. The interface enables a user to "drill down" into lower levels of the timing information hierarchy by 'clicking' on currently displayed information. The information is presented in a form most appropriate to the level of analysis. The presentation forms include, for example, pie-charts, multi-variable timing diagrams (in both absolute and relative forms), data exchange charts, and so on, and 'zoom' capabilities are provided as appropriate to the particular display form.

56 Claims, 5 Drawing Sheets

APPLICATION DELAY ANALYSIS

This application claims the benefit of U.S. Provisional Patent Applications No. 60/703,584, filed 29 Jul. 2005.

BACKGROUND AND SUMMARY OF THE INVENTION

This invention relates to the field of network analysis, and in particular to a graphic user interface that facilitates an understanding of the cause of delays within a network-based application, based on a hierarchical organization and presentation of timing information related to the application.

The capabilities of network analysis tools continue to increase, as the need for such tools increase in this age of virtually continuous communication, and communication expectations. The demand for efficient and effective communications is fueled by the increasing availability of network-enabled applications. Not only must a communication system provide efficient and reliable links between and among nodes, it must also provide for the efficient and reliable operation of the more popular applications on the network.

In like manner, the demand for applications that run efficiently in a network environment is also increasing. Application developers need to take 'network effects' into account when developing or improving an application, to assure that the application runs efficiently in a 'real' environment.

As the availability of information from network analysis tools increases, however, the ability of a network manager or application developer to effectively access and use this information tends to decrease. A network manager or application developer may not be aware of the entire range of capabilities of a particular tool. In many instances, a particular user may not use the same vocabulary that the provider of the tool uses, and significant amounts of time can be wasted merely searching for a particular differently-named feature. Additionally, even when the desired information is found, it is often difficult to determine which "next" information set to review, to further isolate a particular problem or investigation. And, if this "next" information is presented in a different context than the currently viewed information, the context-shift may also tend to distract and/or confuse the user.

It is an objective of this invention to provide a method and system that facilitates the analysis of timing information related to network-based applications. It is a further objective to provide an easy to use graphic interface for controlling and displaying timing information relating to network-based applications.

These objectives, and others, are achieved by a method and system that provides a graphic user interface that facilitates the analysis of timing parameters related to network-based applications in a hierarchical manner. At the top level of the hierarchy, the user is presented a summary of the delays incurred while running an application, or while simulating the running of an application, organized by delay categories, including processing delays at each node, as well as propagation delays at each link between nodes. The interface enables a user to "drill down" into lower levels of the timing information hierarchy by 'clicking' on currently displayed information. The information is presented in a form most appropriate to the level of analysis. The presentation forms include, for example, pie-charts, multi-variable timing diagrams (in both absolute and relative forms), data exchange charts, and so on, and 'zoom' capabilities are provided as appropriate to the particular display form.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

A goal of the invention is to present high-level information to the users in an intuitive fashion so that they can quickly identify sources of delay in their applications. As an improvement to conventional network diagnostic engines, this invention comprises a unique drill-down workflow that allows a user to progressively view information from a high-level view of the overall performance of the application down to a low-level view of individual messages or sub-message packets.

By providing an interactive "high-level" view of the performance of the application with regard to processing and communicating messages, a user is able to quickly determine the areas that have the greatest impact on the performance of an application, and is able to easily 'drill down' to lower levels to determine the root causes of the observed higher-level effects. In like manner, anomalous behavior is often quickly recognized via a graphic presentation, and the integration of a hierarchical graphic presentation with a hierarchy-traversing input scheme allows for rapid and efficient problem identification and analysis. In a preferred embodiment, the hierarchy-traversing process is guided via one or more analysis tools, such that the system selects from among alternative lower-level views to present to the user, depending upon the characteristic nature of the underlying data.

Figure 1:
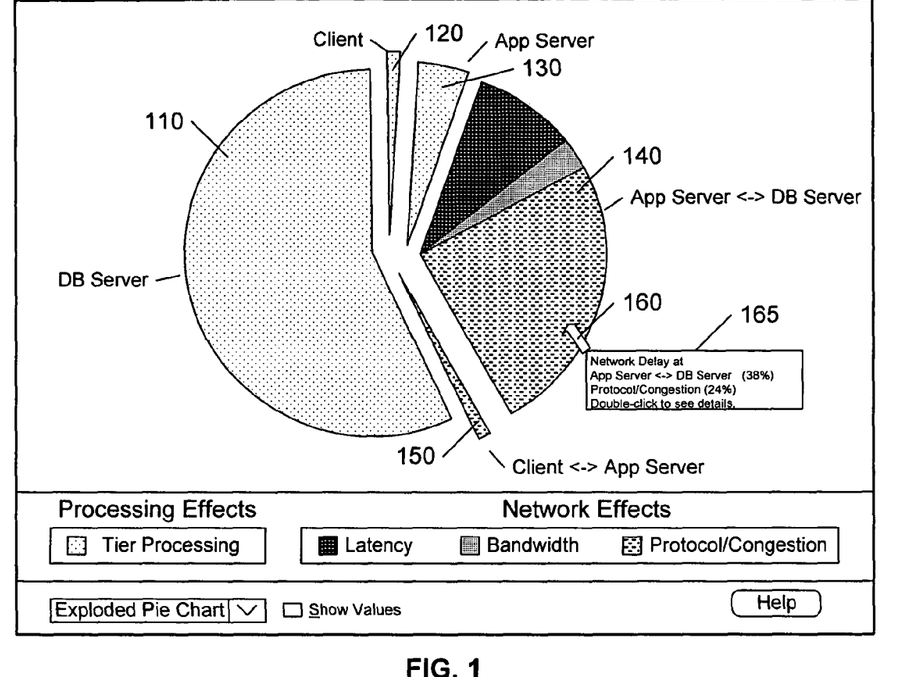
FIG. 1 illustrates an example high-level timing analysis diagram of an example execution of an application in accordance with this invention.

FIG. 1 illustrates an example high-level timing analysis diagram of an execution of an application on a network of nodes. The underlying data used to create this timing analysis diagram may have been obtained from a simulation of the execution of the application on a modeled network, or from an actual execution of the application on an actual network, or a combination of both. The execution of an application, whether simulated or actual, triggers a series of events, including the generation, propagation, and processing of messages at a variety of nodes in the network. In the example of FIG. 1, the events include messages that are generated, processed, and propagated among a client, an application server, and a database server, corresponding, for example, to an application wherein a user interacts with a server to request information, and the server obtains data from a database server to satisfy this request.

The underlying data may be stored in one or more files, collectively referred to as a database for ease of reference. As the term is used herein, a database is a collection of data that is organized for effective retrieval, and includes a distribution of the data among a variety of storage elements. A network simulator, for example, may store data related to the communication of packets among nodes of a network; an application extractor may extract information from the network simulation that is specific to a target application and formulate data records that consolidate the this information; a timing analysis program may process the data to identify and/or classify delays; and so on. For example, a message from one node to another may be communicated via multiple packets that are relayed through multiple other nodes between the source and destination nodes. A message-extraction system may be configured to create a record for each message that summarizes the timing information derived from the individual packet records. In like manner, a transaction-extraction system may summarize information derived from messages created to effect the transaction, and so on. In a preferred embodiment, the system that provides the presentation of high-level information also has access to the database that contains the underlying lower-level information that forms the basis for the upper-level information presentation.

The timing analysis diagram of FIG. 1 presents summary statistics related to the source of delays during the simulation of a sample use of the application in a segmented/exploded pie-chart format. In accordance with an aspect of this invention, a distinction is made between the delays that are related to the processing of the message and delays that are related to the transmission of the message.

The Tier Processing delay is the delay that is incurred at the tier node between the time that a message is received and the time that a response to the message is produced. For example, when the client sends a request to the application server, the tier processing time/delay will generally include the time required to parse the request, the time required to react to the request, and the time required to generate the request that will be sent to the database server. If the tier corresponds to a user-device, the delay may also include an estimated user "think-time" delay between the user's receipt of one message and the user's generation of the next message.

The Link Traversal delay, or Network Effects, is the delay that is incurred between the time that the message is ready for transmission from a source tier to the time that the message is completely received at the destination tier. In a preferred embodiment, the link traversal delay includes a variety of components:

Latency/Propagation time: the delay incurred for a bit of a message to travel from the source to the destination, generally determined by the distance between the source and destination, and the speed of light/electromagnetic propagation.

Bandwidth/Transit time: the delay incurred for all of the bits of the message to be transmitted, generally determined by the bandwidth of the channel and the number of bits in the message.

Congestion/Protocol time: the delay incurred to gain access to the channel to effect the transmission, generally determined by the difference between the time that the message was ready for transmission and the time that it was actually transmitted, including retransmissions. Optionally, the system may be configured to distinguish between protocol delay and congestion delay, and, optionally, may distinguish 'elf-congestion' delay caused by other packets from the same application. Generally, the protocol delay includes the overhead associated with conforming to a protocol, such as waiting for an acknowledgement of a prior packet before sending a next packet, and so on.

FIG. 1 illustrates the accumulated tier processing delay 110, 120, 130 for each of the example tiers/nodes (DB Server 110, Client 120, and App Server 130) in the example application, and the link traversal delay 140, 150 for each of the active links (the App Server—DB Server link 140, and the Client—App Server link 150). In this example, there are only two active links between the tiers, because the client and the database server do not communicate directly with each other. In this example, the processing at the DB Server tier accounts for about 58% of the total accumulated delay, while the link traversal delay between the App Server tier and the DB Server tier accounts for 38% of the total delay.

In accordance with an aspect of this invention, the display includes an 'information cursor' 160, in that when the user moves the cursor over a portion of a graphic item, an information box 165 appears, and provides information regarding the data that produced the graphic item. In this example, the cursor 160 is placed over the congestion/protocol segment of the App Server—DB Server link wedge 140, and the information box 165 indicates that the link traversal delay amounts to 38% of the total delay, and the congestion/protocol component amounts to 24% of the total delay. If the cursor is moved to the client—app server link wedge 150 of the pie-chart, it would indicate that about 3% of the total delay is incurred at the link, primarily attributed to the congestion/protocol component, with insubstantial contributions from the bandwidth or latency components.

Figure 2:
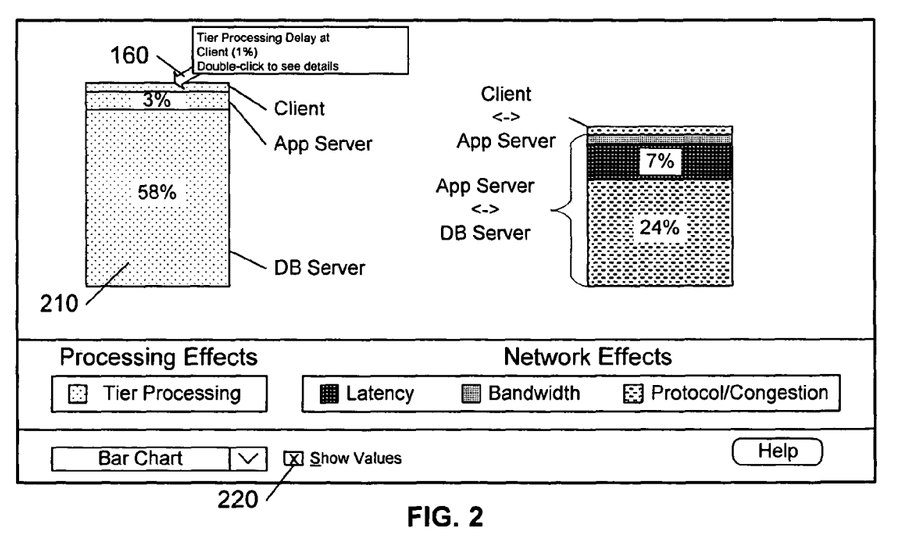
FIG. 2 illustrates a bar-chart timing analysis diagram of the example execution of the application of FIG. 1.

FIG. 2 illustrates an alternative bar-chart display of the delays of the example of FIG. 1. In this example, separate bar charts are displayed for each of the "Processing Effects" (tier delay), and "Network Effects" (latency, bandwidth, protocol, and congestion delays). The "Show Values" box 220 is checked, and in response, the value of each bar segment is displayed within each of the larger segments; the specific values of the other segments can be displayed by placing the information cursor 160 over the segment of interest.

Other techniques for graphically illustrating summary statistics regarding traffic flow may also be used. For example, copending U.S. patent application Ser. No. 11/358,536, "APPLICATION LEVEL INTERFACE TO NETWORK ANALYSIS TOOLS", filed 21 Feb. 2006 for Malloy et al., incorporated by reference herein, illustrates a hierarchical "tree-view" presentation of application level traffic, wherein graphics associated with the upper levels of the hierarchy correspond to a summary of the timing information contained in the leaf nodes of the hierarchy. This copending application also illustrates a "tier-circle" display that includes a circle (or oval) with each active tier arranged around the perimeter of the circle. Arrows between the tiers identify one or more communication channels between pairs of tiers, with characteristics of the arrows, such as their width, shading, color used to graphically illustrates one or more attributes of the channel or of the traffic passed between the tiers via the channel.

In accordance with an aspect of this invention, the pages that illustrate the summary statistics in graphic form are interactive, such that a user can click on the select objects in the graphic presentation to obtain additional information regarding the data that formed the summary statistic. Note that in addition to providing information regarding the statistics associated with the image, the example information box 165 of FIG. 1 includes instructions ("Double-click to see details"), commonly termed a "tool-tip", regarding interacting with the graphic object. In this example, if the user double-clicks on the wedge 140 of the tier-circle display of FIG. 1, corresponding to the amount of network delay on the App_server<->DB server link, the example image of FIG. 3A may appear. In like manner, if the user double-clicks on the wedge 110, corresponding to the amount of delay accumulated at the DB_server node, the example image of FIG. 6A may appear, which provides details regarding the processing of messages at the node.

Figure 3A:
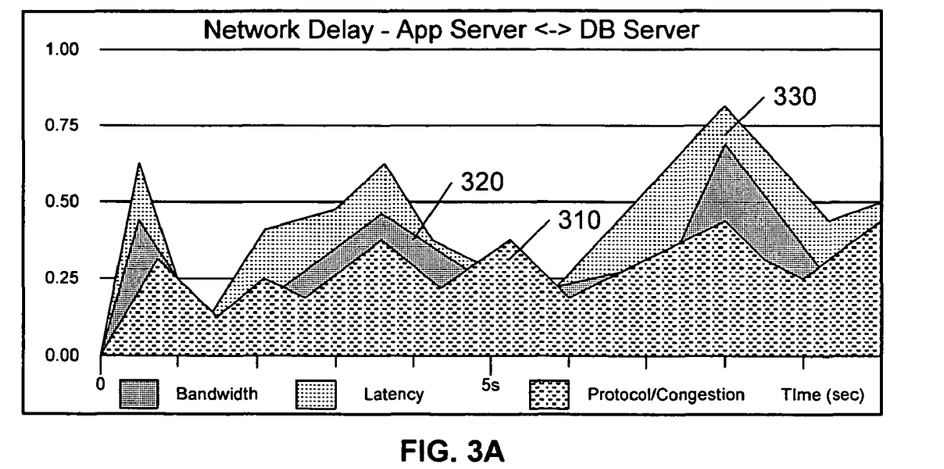
FIG. 3A illustrates a lower-level timing analysis diagram corresponding to a selected section of the higher-level timing analysis diagram of FIGS. 1 or 2 in accordance with this invention.

FIG. 3A illustrates an example delay distribution diagram for the App_server<->DB server link, as might be presented when a user selects/double-clicks the wedge 140 of the tier-circle display of FIG. 1 to investigate the underlying cause of the delays illustrated by the wedge 140. As contrast to the illustration of the total delay associated with the App_server <->DB server link in FIG. 1, FIG. 3A illustrates the distribution of this delay along a time axis, thereby providing a finer view of the same data to facilitate a visual appreciation of when the delays are incurred. Such a presentation is particularly beneficial when an application exhibits 'spikey' behavior, wherein substantial delays are incurred at particular points in time during the execution of the application. In the illustrated delays of FIG. 3A, the congestion/protocol delay 310 appears fairly uniform, whereas the bandwidth delay 320 and latency delay 330 occur intermittently, indicating this application generally waits for access to the network, then communicates its messages with minimal limitations imposed by the available bandwidth or the distance between nodes. Conversely, if the bandwidth 320 exhibited substantial peaks across time, for example, the indication might be that the application should be modified to communicate smaller messages distributed more uniformly over time.

Figure 3B:
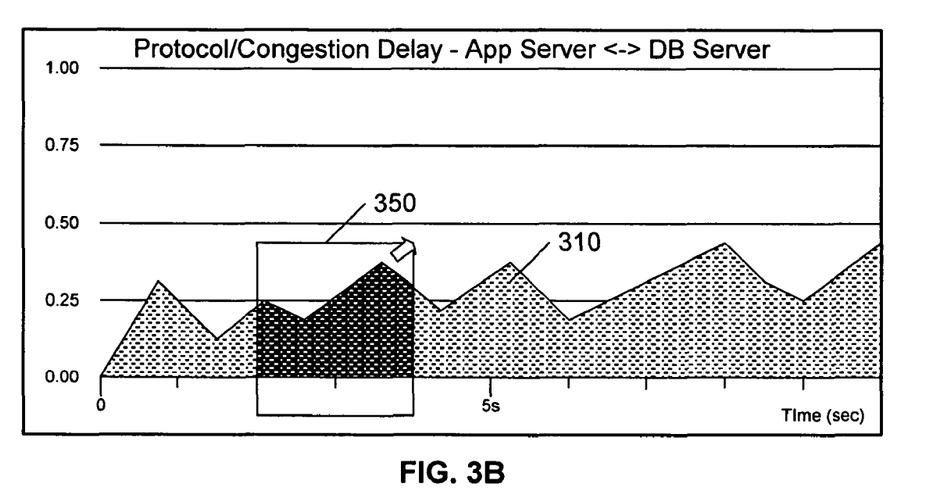
FIGS. 3B-3C illustrate a progressive selection of a segment of FIG. 3A to provide finer degrees of resolution in accordance with this invention.

The view of FIG. 3A also facilitates user input to further investigate the illustrated characteristics. FIG. 3B illustrates an example effect of selecting/double-clicking on the congestion/protocol delay 310 of FIG. 3A, and FIG. 3C illustrates an example effect of selecting a region 350 of the illustrated delay 310 in FIG. 3B for a more detailed/zoomed-in view.

Figure 3C:
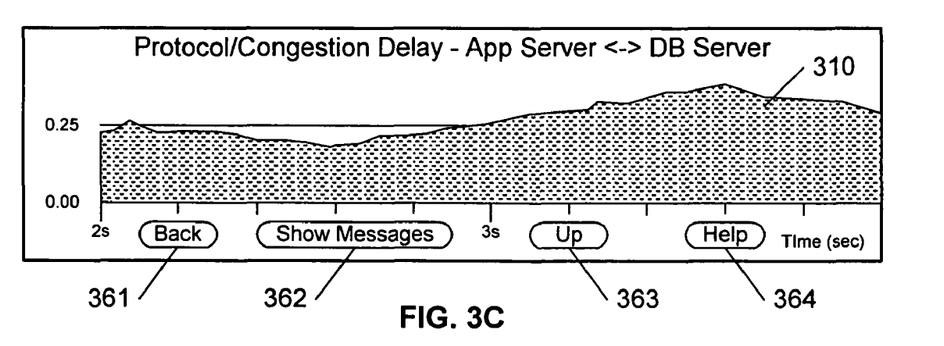
Figure 4:
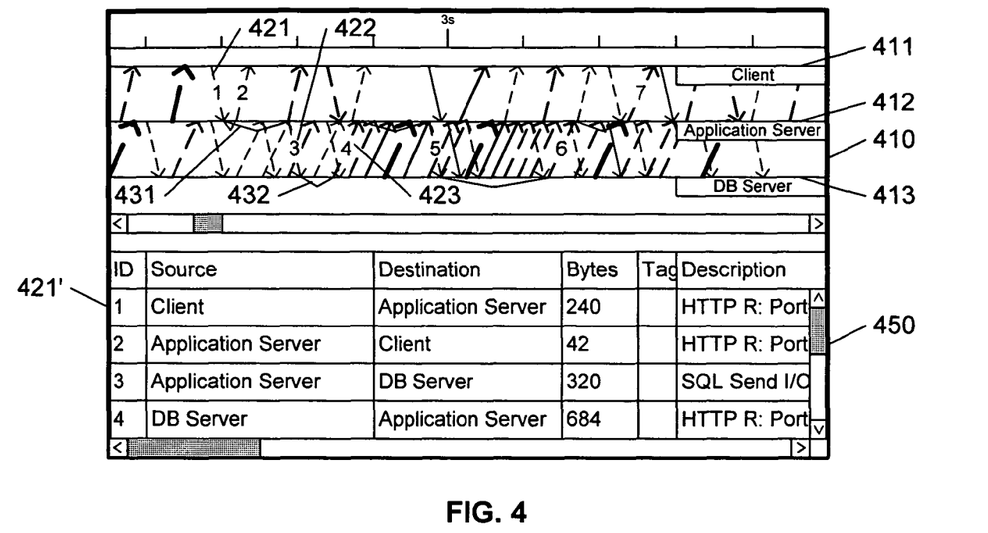
FIG. 4 illustrates a data exchange chart corresponding to a selected segment of an execution of an application in accordance with this invention.

Also illustrated in FIG. 3C are navigation and help buttons 361-364 that facilitate subsequent actions by the user. Such buttons 361-364, and others, are preferably provided in each of the available views, but are illustrated only in FIG. 3C so as not to clutter the other drawings in this disclosure. As their titles imply, the "Back" button 361 presents the user with the immediately prior view, in this case the view of FIG. 3B, and the "Up" button 362 presents the user with the next-higher hierarchical view; in this case, the view of FIG. 3A. The "Show Messages" button 362 presents the user with a view of the messages that accounted for the illustrated delay, using, for example, a 'data exchange chart' view as illustrated in FIG. 4 and discussed further below. The "Help" button 364 presents a pop-up 'help window' that facilitates the presentation of material to guide the user in understanding the current view, the function of the available selection buttons, the options available from this view, and so on.

FIG. 4 illustrates an example 'message window' that illustrates the exchange of messages between tiers, as might be presented in response to a user selecting a "display message" button in any of the other views. The format of this message window includes a graphic presentation of the messages between tiers in a 'data exchange' format in the upper window 410, and in a 'tabular' format in the lower window 450.

In the data exchange chart window 410, the tiers are represented on horizontal time lines 411-413, and the messages between the tiers are represented as arrows 421, 422, 423. Each arrow's tail being located at the time that the message was available for transmission from the source tier, and head located at the time that the message was received at the destination tier. Preferably, one or more characteristics of the arrows, such as width, pattern, color, etc. are used to illustrate one or more attributes of each message, such as its size, delay components, and so on.

The illustrated data exchange chart 410 represents an example simulation of a network with message traffic from a variety of applications, and the numbered (1, 2, 3 . . . ) arrows represent the messages (hereinafter message-1, message-2, etc.) that have been identified as corresponding to a particular target application. Copending U.S. patent application Ser. No. 11/358,538, "TRACKING, ANALYZING, AND VISUALIZING APPLICATION DELAY", filed 21 Feb. 2006 for Malloy et al., discloses techniques for tracking and identifying application-level messages among a mixture of traffic, and is incorporated by reference herein. Preferably, the system provides the option of 'locking-out' unrelated messages, so that only the messages related to the application of interest are detailed in the tabular message view window 450, and, optional, so that the un-related messages can be optionally 'grayed-out' or removed from the data exchange chart window 410.

Generally, a tier receives a message, and in response to that message, generates one or more response messages. This causal relationship between messages is termed a 'dependency', and such dependencies are illustrated in the example data exchange chart by "V" shaped connectors between the end time of one message at the tier and the start time of the dependent message at the tier. For example, the connector 431 illustrates the dependency of message-3 422 on the receipt of message-1 421 at the Application Server tier 412, and the connector 432 illustrates the dependency of message-4 423 on receipt of message-3 422 at the DB Server tier 413. The time required at the tier to process the incoming message and prepare the outgoing message determines the duration of each dependency 431, 432, and corresponds to the aforementioned tier-processing delay.

The message tabular window 450 provides a listing of each identified/selected message, and each of the attributes associated with the message, including its source, destination, size, start-time, end-time, dependency, and so on. That is, the entry at 421' identifies message-1 421 (ID "1"), its source tier ("Client"), destination tier ("Application Server"), size ("240" bytes), and so on.

Thus, as illustrated in the examples of FIGS. 1 through 4, a user is able to view the high-level performance characteristics of an application running on a network, and progressively drill-down to lower and lower levels of detail while being presented a graphic presentation of the information available at each level, with optional text presentations as well.

Figure 5:
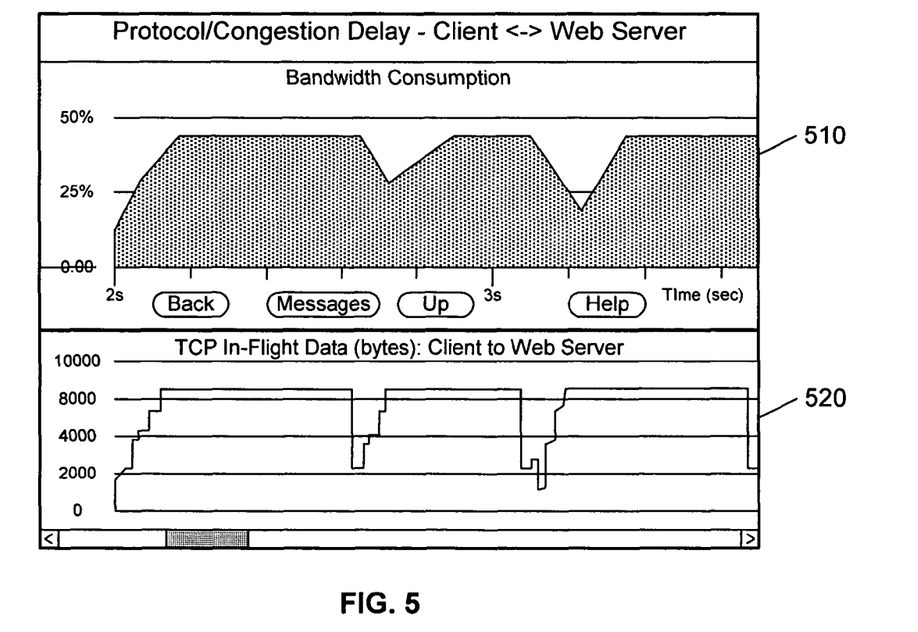
FIG. 5 illustrates another form of a lower level timing analysis diagram in accordance with this invention.

FIG. 5 illustrates another graphic presentation of performance/delay characteristics of a network application. In this example, a user has drilled down to view congestion/protocol delay and the invention has automatically selected two graphs 510, 520 for display that attempt to identify potential sources of delay. The upper graph displays bandwidth consumption 510 as the percentage of available bandwidth used over time. In bulk transfer applications, periods of low bandwidth consumption may indicate a congestion/protocol problem. The lower graph of FIG. 5 displays TCP in-flight data 520, which represents the current amount of data that has been sent but not yet acknowledged. The TCP in-flight data may indicate that TCP is throttling the data flow as a result of congestion/protocol delay. In other situations, the system may display other combinations of graphs; for example, if the bandwidth delay does not exhibit the characteristic "plateauing" associated with TCP throttling, the system might only display the TCP in-flight data, or it may display the TCP in-flight data with another graph, commonly a data exchange chart such as illustrated in FIG. 4.

Other schemes can be used for selectively displaying alternative views. For example, if the traffic-pattern/delay-pattern exhibits symptoms of a retransmission bottleneck, a view that highlights the retransmission requests may be presented. Similarly, if the traffic pattern exhibits a high number of out-of-sequence packets, but does not exhibit a retransmission bottleneck, a view that highlights the out-of-sequence packets or messages may be presented. Other types of bottlenecks or other anomalous behavior may also trigger the selection of particular presentations, such as the presentation of "TCP advertised receive window" when frozen window bottlenecks are detected, and of "TCP Nagle delay" when many small-size messages are detected, and so on.

Conversely, other views/presentations may be available, but never presented unless explicitly requested, based on an assessment of their relative merits in assessing an application's performance. For example, a view that shows the overall network throughput rarely provides insight into the cause of a lack of throughput, and thus is not typically presented unless specifically requested.

Depending upon the configuration of the user's display, and/or the user's preferences, any of a variety of combinations of displays may be simultaneously displayed. For example, a user may select a view to be "persistent", such that it is always displayed as the user drills down to lower levels, or a user may select to have the system automatically display a particular view, such as the data exchange chart, along with any other requested or suggested view at the lower levels, and so on. In like manner, the user can selectively disable, or selectively override, the system's automatic view-selection, and, in select 'expert-user' embodiments, may be permitted to modify the rules used to select some or all of the different views. For example, a particular user may find a particular view useful for diagnosing frozen-window bottlenecks, and can configure the system to provide this view in addition to, or in lieu of, the view that is routinely provided when frozen-window bottlenecks are detected.

Figure 6A:
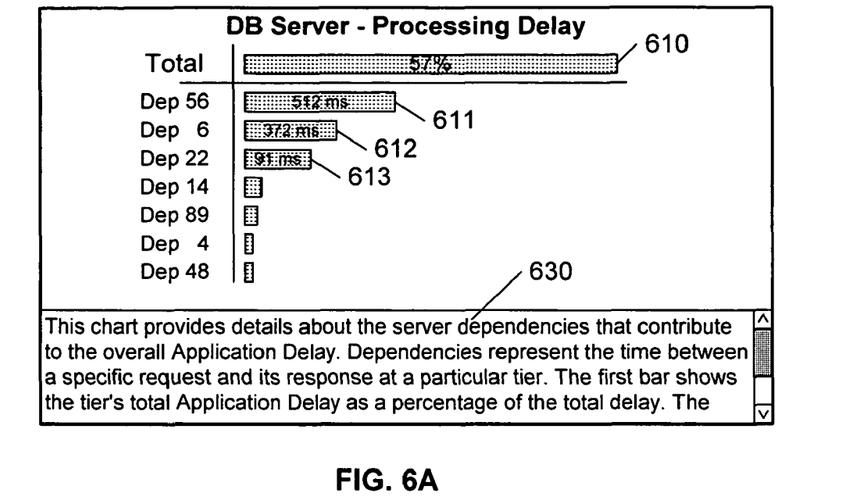
FIGS. 6A and 6B illustrate another form of lower level timing analysis diagrams in accordance with this invention.
Figure 6B:
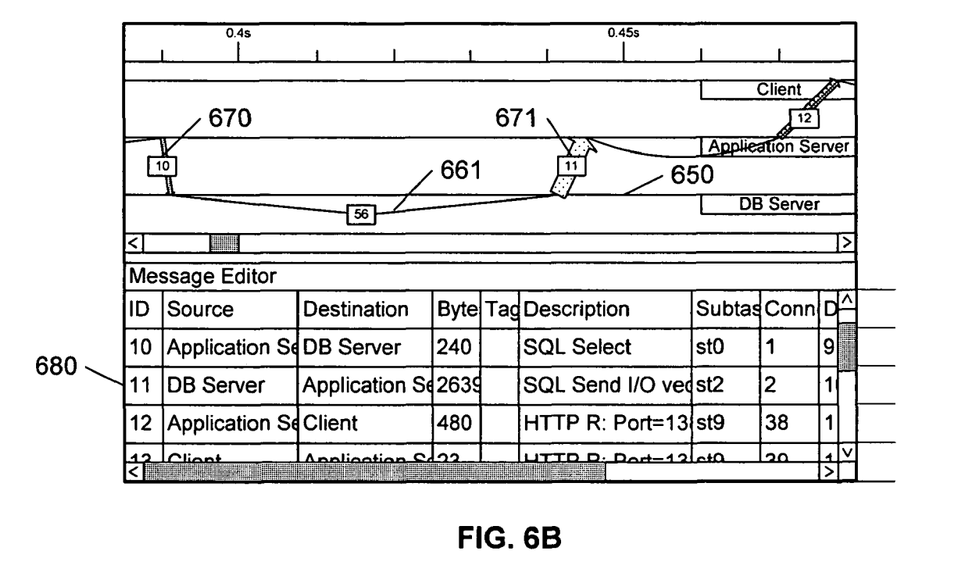

Thus far, the examples have addressed the analysis of network delays. FIGS. 6A-6B illustrate example drill-down views that facilitate an assessment of tier delays. FIG. 6A is an example dependency-delay view that may be presented when a user selects/double-clicks on a tier wedge 110 in FIG. 1, or tier bar-segment 210 in FIG. 2. In the example of FIG. 1, the tier delay 110 amounts to about 58% of the total delay. This total tier delay is illustrated by the upper bar 610 in the display of FIG. 6A.

As discussed above, the delay at the tiers is reflected in the duration of the dependencies between the receipt of one message and the generation of a corresponding next message. To facilitate an identification of the tier delays that significantly contribute to the overall delay, the tier-view of FIG. 6A presents a list of each dependency, sorted by the duration of the dependency, with a bar-chart display of each duration 611, 612, 613, and so on. In this manner, the user can determine whether the durations are relatively uniformly distributed, or whether particular dependencies seem to be major contributors.

As with the other views of this invention, the view of FIG. 6A facilitates a drill-down to lower level details associated with the information presented. FIG. 6B illustrates a data exchange chart view that may be provided when a user selects/double-clicks the "Dep 56" bar 611 in FIG. 6A. In response to the selection, the data exchange chart is configured to provide a graphic view of the dependency-56 661 as it occurs along the time line 650 of the DB Server. As illustrated, this dependency-56 661 corresponds to receipt of message-10 670 at the DB Server, and accounts for the preparation of the corresponding response message-11 671. As illustrated, the response message-11 671 is fairly large, as illustrated by the width of the arrow. As such, because the DB Server is generating a large response 671 to a request 670, a relatively long processing time 661 would not be unusual. The tabular message view 680 is also provided, should additional details regarding these messages be desired.

It is significant to note that this diagnosis of "not unusual" for the largest dependency illustrated in FIG. 6A would have been reached by a user very quickly, because a simple selection of the bar 611 presents a graphic view that is easily assimilated to reach this "not unusual" determination. A similar drill-down of the other major contributors to the tier delay can provide a similar "OK/not-OK" determination to assess whether the delays at the DB Server are problematic.

FIG. 6A also illustrates an information text box 630. This text box 630 contains information that facilitates understanding of the displayed information, either in a general instruction form, or in a form that is customized based on the particular data being displayed, or a combination of both. Preferably, such a text box is provided for each of the variety of views that are available, but is illustrated only in FIG. 6A to avoid cluttering of the other figures.

The information text box 630 is preferably coupled to the aforementioned automatic selection of the form of display when the delays exhibit characteristic patterns, to provide information regarding the typical cause of the exhibited behavior, and, if available, a suggested solution. For example, if a Nagle bottleneck is detected, the aforementioned "TCP Nagle delay" graph is presented, and the information window 630 informs the user that many small messages accounted for a large proportion of the congestion/protocol delay, and the use of Nagle's algorithm may help reduce protocol delay by forcing small messages to wait until larger segments can be formed for more efficient transmission.

Figure 7:
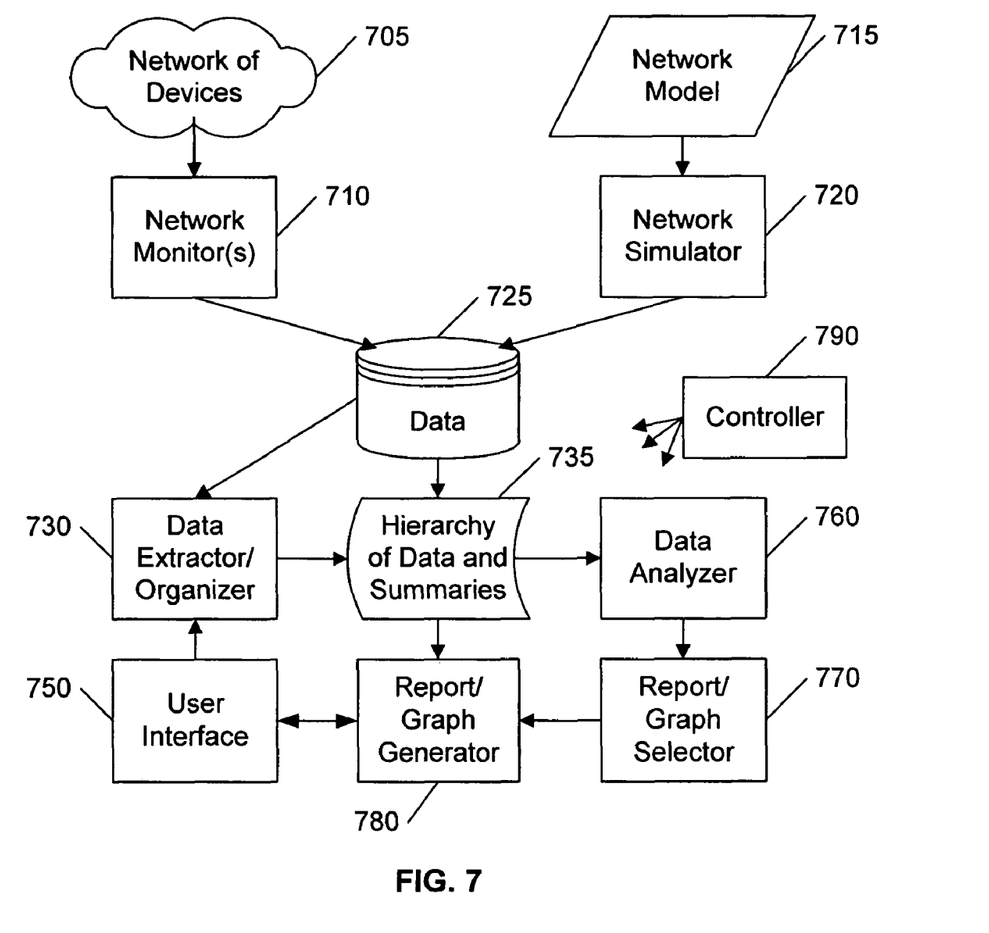
FIG. 7 illustrates a block diagram of an example timing analysis system.

FIG. 7 illustrates an example block diagram of a system that embodies some or all of the above features and capabilities.

A database 725 is configured to receive data corresponding to the execution of an application on a network of communication and processing devices, commonly termed 'nodes' of the network. This execution of the application may be "real" or "simulated", or a combination of both. In a real execution, network monitors 710 collect the data as the application is executed on the network 705; in a simulated execution, a network simulator 720 simulates/imitates the execution of the application on a model 715 of the network, as described, for example, in U.S. Pat. No. 6,820,042, "MIXED MODE NETWORK SIMULATOR", issued 16 Nov. 2004 to Cohen et al. and incorporated by reference herein. In a preferred embodiment, the simulator 720 includes capabilities that facilitate the tracing of messages that are related to target applications, such as detailed in copending U.S. patent application Ser. No. 11/358,538, "TRACKING, ANALYZING, AND VISUALIZING APPLICATION DELAY", filed 21 Feb. 2006 for Malloy et al., and incorporated by reference herein.

A data extractor/organizer 730 is configured to process the data 725 and organize it in a manner that facilitates the generation of one or more of the above described reports at different levels of detail. This hierarchically organized data 735 may be stored in a database that can be subsequently accessed by independent report generators, or stored internally in an embodiment that includes an integral combination of the data extractor 730 and report generator 780, as well as some of the other components of FIG. 7. The user interface 750 is configured to facilitate control of the data extractor and the report generator 780 to provide the aforementioned drill-down capabilities through the variety of levels of the hierarchical data 735.

The report generator 780 is configured to generate the graphic and text displays discussed above. In accordance with one aspect of this invention, the report generator 780 is configured to provide selected displays based on the characteristics of the underlying data. A data analyzer 760 is configured to analyze the data, in either 'raw' 725 or 'processed' 735 form to identify one or more characteristic patterns, such as patterns of bottleneck, and other delay-inducing situations. A report selector 770 is configured to determine which reports to select for presentation to the user by the report generator 780, based on the identified characteristic patterns.

A controller 790 coordinates and controls the interactions among some or all of the aforementioned components to effect the above operations. This controller 790 may be a single controller or a distribution of a variety of controllers, depending upon the particular embodiment. In like manner, the data sets 725 and 735 may be distributed among a variety of storage devices, and/or among a variety of data structures or data objects.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements.

We claim:

1. A method for embodiment on a network analysis machine comprising:

accessing, by the network analysis machine, a database stored on one or more memory devices that includes timing data related to communication of messages among tiers of a network, corresponding to an execution of an application on the network, displaying, on a display device, a graphic image that includes a plurality of graphic items that are configured to represent a plurality of delay statistics, each delay statistic corresponding to a delay type of a plurality of delay types, and receiving, at the network analysis machine, via a graphic user interface, a user's selection of a select graphic item of the plurality of graphic items corresponding to a select delay statistic, and displaying, on the display device, an other graphic image that includes a plurality of other graphic items corresponding to the select delay statistic, wherein the other graphic image is selected by the network analysis machine from among a plurality of timing diagram formats based on the delay type corresponding to the select delay statistic, at least two of the delay types corresponding to different timing diagram formats.

2. The method of claim 1, wherein the timing data corresponds to results of a simulation of the application on a model of the network.

3. The method of claim 1, wherein the timing data includes values of time associated with the communication of each of the messages across links between pairs of the tiers, and each of the delay statistics of the plurality of delay statistics corresponds to a determined delay that is based on the values of the time associated with the communication of the messages across each of the links.

4. The method of claim 1, wherein the timing data includes values of time associated with the processing of each of the messages, and the summary statistic of each tier is based on a sum of delays that are based on the values of the time associated with the processing of the messages at the tier.

5. The method of claim 1, wherein the graphic image corresponds to a pie-chart, the plurality of graphic items corresponds to a plurality of wedges of the pie-chart, and an area of each wedge of the plurality of wedges is based on a value of the delay statistic for each link of a plurality of links between pairs of the tiers.

6. The method of claim 1, wherein the plurality of objects includes a plurality of links between pairs of the tiers, the graphic image includes a plurality of points corresponding to each of the tiers arranged on a perimeter of a curved shape, the plurality of graphic items corresponds to a plurality of chords connecting the points corresponding to each of the tiers of each link between a pair of tiers, and a characteristic of each chord of the plurality of chords is based on a value of the delay statistic for the corresponding link.

7. The method of claim 1, wherein the plurality of objects includes a plurality of links between pairs of the tiers, the delay statistic is based on a sum of delays associated with the communication of the messages on each link and the graphic item corresponding to each link includes an indication that is based on a sum of the delays for each delay type.

8. The method of claim 7, wherein the delay types include: a bandwidth delay, a latency delay, and a congestion/protocol delay.

9. The method of claim 8, wherein the delay types include a protocol delay and a congestion delay that form at least a portion of the congestion/protocol delay.

10. The method of claim 8, wherein the delay types include a self-congestion delay that forms at least a portion of the congestion/protocol delay.

11. The method of claim 1, wherein the other graphic image includes a time line, and the plurality of other graphic items includes line segments that illustrate values of the data as a function of time.

12. The method of claim 11, wherein the plurality of objects includes a plurality of links between pairs of the tiers, the delay statistic is based on a sum of delays associated with the communication of the messages on each link, the plurality of other graphic items includes sets of line segments, each set of line segments corresponding to values of the timing data for each delay type as a function of time.

13. The method of claim 11, including receiving a selection of a segment of the time line, and displaying a subset of the plurality of other graphic items at a finer resolution, based on the selection of the segment of the time line.

14. The method of claim 11, wherein the values of the timing data corresponds to one or more of: a bandwidth delay, a latency delay, a congestion delay, a protocol delay, a congestion/protocol delay, a network delay, and a processing delay.

15. The method of claim 11, wherein the values of the timing data corresponds to one or more of: in-flight packets, network throughput, link bandwidth, retransmissions, out-of-sequence packets, TCP Nagle's delay, and TCP advertised receive window.

16. The method of claim 1, wherein the other graphic image includes a time line for each of two or more tiers, and the plurality of other graphic items includes connectors between pairs of the two or more time lines corresponding to messages communicated between the corresponding pairs of the two or more tiers as a function of time.

17. The method of claim 16, wherein one or more graphic characteristics of each connector is dependent upon a value of one or more attributes of the corresponding message.

18. The method of claim 16, wherein the plurality of other graphic items includes other connectors between pairs of the connectors on the time line of at least one tier, corresponding to a dependency between pairs of messages corresponding to the pairs of the connectors, wherein a distance between the connectors of each pair of connectors on the time line of the at least one tier corresponds to a processing delay at the tier.

19. The method of claim 16, including presenting a tabular listing of attributes of one or more of the messages communicated between the corresponding pairs of the two or more tiers.

20. The method of claim 19, wherein the attributes include two or more of: a message size, a start-time, an end-time, and a dependency.

21. The method of claim 16, including simultaneously displaying a further graphic image that includes a plurality of further graphic items that are configured to represent further data corresponding to the delay statistic for the select graphic item in an alternative form.

22. The method of claim 21, wherein the plurality of further graphic items illustrate values of the further data as a function of time, based on the time line of the other graphic image.

23. The method of claim 22, wherein the values of the timing data corresponds to one or more of: a bandwidth delay, a latency delay, a congestion delay, a protocol delay, a congestion/protocol delay, a network delay, and a processing delay.

24. The method of claim 22, wherein the values of the timing data corresponds to one or more of: in-flight packets, network throughput, link bandwidth, retransmissions, out-of-sequence packets, TCP Nagle's delay, and TCP advertised receive window.

25. The method of claim 21, including determining a characteristic of the timing data, and selecting the further graphic image from a variety of other graphic images, based at least in part on the characteristic of the timing data.

26. The method of claim 1, including displaying one or more textual information items corresponding to the graphic image.

27. The method of claim 1, including displaying one or more textual information items corresponding to the graphic items to facilitate the selection of the select graphic item.

28. The method of claim 27, wherein the one or more textual information items are displayed based on a location of a user-controlled cursor.

29. The method of claim 1, including receiving a selection of a select other graphic item of the plurality of other graphic items, and displaying a further graphic image that includes a plurality of further graphic items that are configured to represent a plurality of further data corresponding to the timing data corresponding to the select other graphic item.

30. The method of claim 1, wherein the plurality of objects includes a plurality of links between pairs of the tiers, the timing data includes values of size associated with each of the messages, and the delay statistic of each link is based on a traffic sum based on the values of the size associated with all of the messages communicated over the link.

31. The method of claim 1, including determining a characteristic of the timing data corresponding to the delay statistic, and selecting the other graphic image from a variety of other graphic images, based at least in part on the characteristic of the timing data.

32. The method of claim 31, including obtaining a user input, selecting a further graphic image from a variety of other graphic images, based at least in part on the user input, and displaying the further graphic image that includes a plurality of further graphic items that are configured to represent further data corresponding to the delay statistic for the select graphic item in an alternative form.

33. A system comprising:
a database that is configured to store timing data related to communication of messages among tiers of a network, corresponding to an execution of an application on the network,
a report generator that is configured to provide a graphic image that includes a plurality of graphic items that are configured to represent a delay statistic corresponding to each of a plurality of objects of the network, each delay statistic having an associated delay type of a plurality of delay types, and
a user interface that is configured to receive a selection of a select graphic item of the plurality of graphic items corresponding to a select delay statistic,
wherein the report generator is configured to display an other graphic image that includes a plurality of other graphic items that are configured to represent a plurality of the timing data corresponding to the select delay statistic, and the other graphic image is presented using a select timing diagram format of a plurality of timing diagram formats based on the delay type of the select delay statistic, at least two of the delay statistics corresponding to different delay types that effect different timing diagram formats.

34. The system of claim 33, including a simulator that is configured to provide the timing data based on a simulation of the application on a model of the network.

35. The system of claim 33, wherein the plurality of objects includes a plurality of links between pairs of tiers, the timing data includes values of time associated with the communication and processing of each of the messages, and the delay statistic of each link is based on a sum of delays that are based on the values of the time associated with the communication and processing of all of the messages on the link.

36. The system of claim 33, wherein the plurality of objects includes a plurality of links between pairs of tiers, the graphic image corresponds to a pie-chart, the plurality of graphic items corresponds to a plurality of wedges of the pie-chart, and an area of each wedge of the plurality of wedges is based on a value of the delay statistic for a corresponding link between a pair of tiers.

37. The system of claim 33, wherein the plurality of objects includes a plurality of links between pairs of tiers, the delay statistic is based on a sum of delays associated with the communication of the messages on each link, the delays are characterized by a plurality of delay types, and the graphic item corresponding to each link includes an indication that is based on a sum of the delays for each delay type.

38. The system of claim 33, wherein the other graphic image includes a time line, and the plurality of other graphic items includes line segments that illustrate values of the timing data as a function of time.

39. The system of claim 38, wherein the plurality of objects includes a plurality of links between pairs of tiers, the delay statistic is based on a sum of delays associated with the communication of the messages on each link, the delays are characterized by a plurality of delay types, the plurality of other graphic items includes sets of line segments, each set of line segments corresponding to values of the timing data for each delay type as a function of time.

40. The system of claim 38, wherein the user interface is configured to receive a selection of a segment of the time line, and the report generator is configured to display a subset of the plurality of other graphic items at a finer resolution, based on the selection of the segment of the time line.

41. The system of claim 38, wherein the values of the timing data corresponds to one or more of: a bandwidth delay, a latency delay, a congestion delay, a protocol delay, a congestion/protocol delay, a network delay, and a processing delay.

42. The system of claim 38, wherein the values of the timing data corresponds to one or more of: in-flight packets, network throughput, link bandwidth, retransmissions, out-of-sequence packets, TCP Nagle's delay, and TCP advertised receive window.

43. The system of claim 33, wherein the other graphic image includes a time line for each of two or more tiers, and the plurality of other graphic items includes connectors between pairs of the two or more time lines corresponding to messages communicated between the corresponding pairs of the two or more tiers as a function of time.

44. The system of claim 43, wherein the report generator is configured to display a tabular listing of attributes of one or more of the messages communicated between the corresponding pairs of the two or more tiers, wherein the attributes include two or more of: a message size, a start-time, an end-time, and a dependency.

45. The system of claim 43, wherein the report generator is configured to simultaneously display a further graphic image that includes a plurality of further graphic items that are configured to represent further data corresponding to the delay statistic for the select graphic item in an alternative form.

46. The system of claim 45, wherein the plurality of further graphic items illustrate values of the further data as a function of time, based on the time line of the other graphic image.

47. The system of claim 46, wherein the values of the timing data corresponds to one or more of: a bandwidth delay, a latency delay, a congestion delay, a protocol delay, a congestion/protocol delay, a network delay, and a processing delay.

48. The system of claim 46, wherein the values of the timing data corresponds to one or more of: in-flight packets, network throughput, link bandwidth, retransmissions, out-of-sequence packets, TCP Nagle's delay, and TCP advertised receive window.

49. The system of claim 45, including a data analyzer that is configured to determine a characteristic of the timing data, and a report selector that is configured to select the further graphic image from a variety of further graphic images, based at least in part on the characteristic of the timing data.

50. The system of claim 33, wherein the report generator is configured to display one or more textual information items corresponding to the graphic image.

51. The system of claim 50, wherein the one or more textual information items include instructions that facilitate the selection of the select graphic item.

52. The system of claim 51, wherein the one or more textual information items are displayed based on a location of a user-controlled cursor.

53. The system of claim 33, wherein the user interface is configured to receive a selection of a select other graphic item of the plurality of other graphic items, and the report generator is configured to display a further graphic image that includes a plurality of further graphic items that are configured to represent a plurality of further data corresponding to the timing data corresponding to the select other graphic item.

54. The system of claim 33, wherein the plurality of objects includes a plurality of links between pairs of tiers, the timing data includes values of size associated with each of the messages, and the delay statistic of each link is based on a traffic sum based on the values of the size associated with all of the messages communicated over the link.

55. The system of claim 33, including a data analyzer that is configured to determine a characteristic of the timing data corresponding to the delay statistic, and a report selector that is configured to select the other graphic image from a variety of other graphic images, based at least in part on the characteristic of the timing data.

56. The system of claim 33, wherein the user interface is configured to: obtain a user input, and select a further graphic image from a variety of other graphic images, based at least in part on the user input, and the report generator is configured to display the further graphic image that includes a plurality of further graphic items that are configured to represent further data corresponding to the delay statistic for the select graphic item in an alternative form.

* * * * *